United States Patent
Rimkus et al.

(10) Patent No.: US 7,181,366 B2
(45) Date of Patent: Feb. 20, 2007

(54) SYSTEM AND METHOD FOR DETERMINING THE CAUSE OF TIRE PRESSURE CHANGE

(75) Inventors: Robert A Rimkus, Macomb, MI (US); J. David Rosa, Clarkston, MI (US)

(73) Assignee: GM Global Technologies Operations, Inc., Detroit, MI (US)

( * ) Notice: Subject to any disclaimer, the term of this patent is extended or adjusted under 35 U.S.C. 154(b) by 51 days.

(21) Appl. No.: 11/105,055

(22) Filed: Apr. 13, 2005

(65) Prior Publication Data

US 2006/0235651 A1   Oct. 19, 2006

(51) Int. Cl.
*G06F 15/00* (2006.01)
(52) U.S. Cl. .................................. 702/183; 702/182
(58) Field of Classification Search ........... 73/146.3, 73/146.4; 702/98, 99, 138, 140, 183, 182
See application file for complete search history.

(56) References Cited

U.S. PATENT DOCUMENTS

2005/0057348 A1* 3/2005 Hammerschmidt ......... 340/445

FOREIGN PATENT DOCUMENTS

JP          07323708     * 12/1995

* cited by examiner

*Primary Examiner*—Michael Nghiem
*Assistant Examiner*—Douglas N Washburn
(74) *Attorney, Agent, or Firm*—Timothy J. Marsh

(57) ABSTRACT

Methods and apparatus are provided for determining the cause of tire pressure change. The method includes obtaining a first tire pressure ($P_1$) at a first tire temperature ($T_1$) and obtaining a measured second tire pressure ($P_2$) at a second tire temperature ($T_2$). The tire pressure is then estimated ($P_{est}$) at the second tire temperature ($T_2$) and the estimated tire pressure ($P_{est}$) is compared to the second tire pressure ($P_2$). A diagnostic message is then generated indicative of the cause of tire pressure change, the diagnostic message being responsive to the comparing of the measured second tire pressure ($P_2$) with the estimated tire pressure ($P_{est}$).

19 Claims, 1 Drawing Sheet

SYSTEM AND METHOD FOR DETERMINING THE CAUSE OF TIRE PRESSURE CHANGE

TECHNICAL FIELD

The present invention generally relates to tire pressure monitoring, and more particularly relates to determining a cause of tire pressure change.

BACKGROUND

Properly inflated tires are an important part of tire care. Properly inflated tires run cooler and more efficiently, which improves handling, extends tread life and tire life, and increases gas mileage. Vehicle and tire manufacturers typically provide information for proper air pressure for each vehicle tire. The pressures are known as placard pressures, and may be included in the vehicles owner's manual, and may also be on a sticker positioned on the vehicle. Placard pressures are usually given for "cold" tire conditions, such as 30 psi at 30° C. In addition, many times instruction is given to add 3 or 4 psi to the placard pressure if the tire is "warm".

Tires normally lose about one to two pounds of pressure per month. Observant drivers are aware that vehicle environment affects tire pressure, and a conscientious driver will likely be able to determine whether a tire pressure change was caused by a seasonal adjustment (it goes down when the temperature drops and up when the temperature rises), requiring a top-off of pressure on all tires, or an air loss requiring full inspection of all tires.

In a study done by the Rubber Manufacturers Association (RMA) in 2004, only one person in seven correctly checks their car's tire pressure. In addition, the study also found that 30 percent of drivers wrongly believe that the best time to check their tires is when they are warm after being driven for at least a few miles and nearly ⅓ of drivers wrongly believe that if they are taking a trip with a fully loaded vehicle that they are better off if their tires are a little bit underinflated.

This type of information indicates that many drivers do not know when or if a tire is cold or warm, do not know what the proper pressure should be, and if the measured tire pressure does change, do not know if the pressure change was due to temperature change or loss of air from the tire.

Accordingly, it is desirable to provide a method for determining the cause of tire pressure change. In addition, it is desirable to communicate the type of attention required to resolve the tire pressure change. Furthermore, other desirable features and characteristics of the present invention will become apparent from the subsequent detailed description and the appended claims, taken in conjunction with the accompanying drawings and the foregoing technical field and background.

BRIEF SUMMARY

A method is provided for determining tire pressure change. The method comprises obtaining a first tire pressure $(P_1)$ at a first tire temperature $(T_1)$ and obtaining a measured second tire pressure $(P_2)$ at a second tire temperature $(T_2)$. The tire pressure is then estimated $(P_{est})$ at the second tire temperature $(T_2)$ and the estimated tire pressure $(P_{est})$ is compared to the second tire pressure $(P_2)$. A diagnostic message is then generated indicative of the cause of tire pressure change, the diagnostic message being responsive to the comparing of the measured second tire pressure $(P_2)$ with the estimated tire pressure $(P_{est})$.

A method is provided for determining the cause of tire pressure change from a first tire temperature $(T_1)$ to a second tire temperature $(T_2)$. The method comprises estimating tire pressure $(P_{est})$ for the second tire temperature $(T_2)$ and measuring a second tire pressure $(P_2)$ for the second tire temperature $(T_2)$. The estimated tire pressure $(P_{est})$ is then compared to the second tire pressure $(P_2)$ and if the estimated tire pressure $(P_{est})$ is equivalent to the second tire pressure $(P_2)$, indicating that the pressure change is due to temperature, and if the estimated tire pressure $(P_{est})$ is not equivalent to the second tire pressure $(P_2)$ indicating that the pressure change is due to air loss.

An apparatus is provided for a tire pressure system. The apparatus provides a tire pressure sensor capable of measuring tire pressure and a tire temperature sensor capable of measuring tire temperature. The system further provides processing logic capable of estimating and comparing tire pressures at different temperatures for determining the cause of tire pressure change.

BRIEF DESCRIPTION OF THE DRAWINGS

The present invention will hereinafter be described in conjunction with the following drawing figures, wherein like numerals denote like elements.

DETAILED DESCRIPTION

Figure 1:
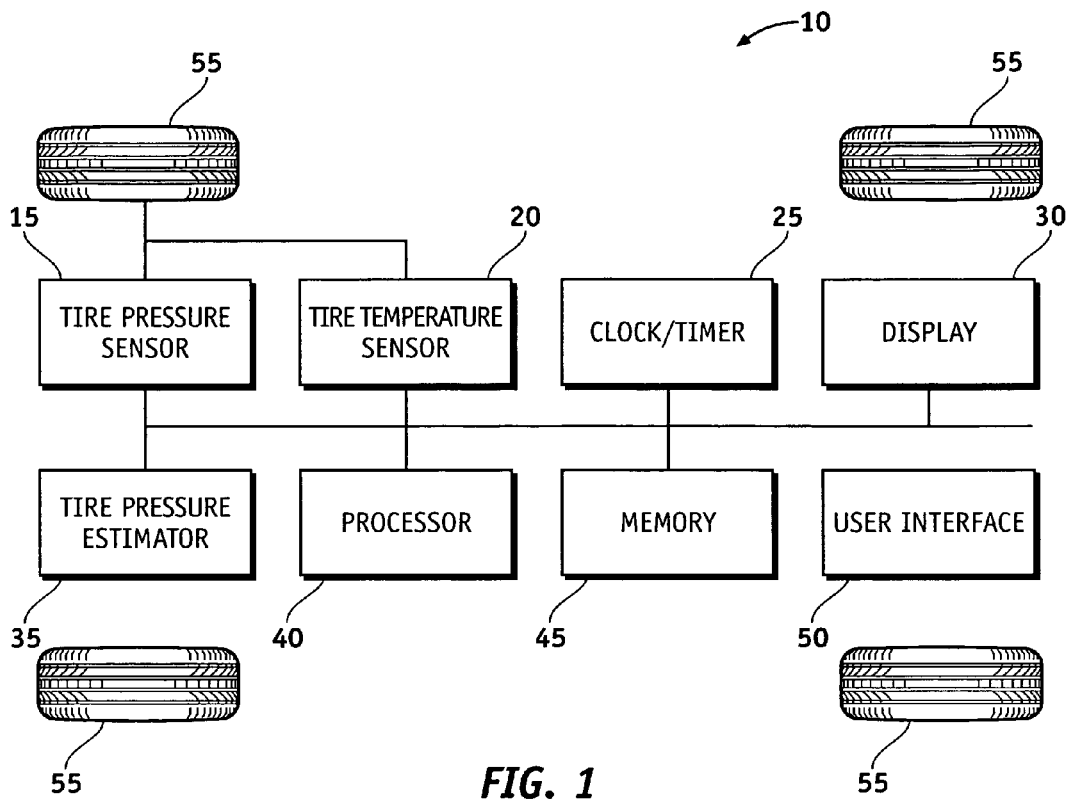
FIG. 1 is a system diagram of an example tire pressure system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The invention may be described in terms of functional and/or logical block components and various processing steps. It should be appreciated that such block components may be realized by any number of hardware, software, and/or firmware components configured to perform the specific functions. For example, embodiments of the invention may utilize sensors to obtain information such as tire pressure and temperature, and input this information into equations in a processor. To accomplish this, the invention may employ integrated circuits, e.g., memory elements, digital signal processing elements, logic elements, look-up tables, or the like, which may carry out a variety of functions under the control of one or more microprocessors or other control device. In addition, those skilled in the art will appreciate that the present invention may be practiced in conjunction with any number of vehicle systems and that the particular implementation described herein is merely one exemplary application of the invention.

For the sake of brevity, conventional techniques related to tire sensors, temperature sensors, data processing, data transmission from the sensors to the processor, and other functional aspects of the system (and individual operating components of the systems) may not be described in detail herein. Further, connecting lines shown in various figures contained herein are intended to represent example functional relationships and/or physical couplings between various elements. It should be noted that many alternative or additional functional relationships or physical connections may be present in a practical embodiment.

One of the fundamental laws of thermodynamics is that a relationship exists between pressure, temperature, and volume. This law is expressed as the equation:

$$PV=nRT.$$

where: P=pressure;
T=temperature;
V=volume;
n=the number of moles of gas present; and
R=the universal gas constant.

Predicated on this law, changes in measurable tire pressure can be affected by any of these variables. In the case of a vehicle tire, the volume of the tire is usually constant, with minor variations in volume seen in properly and moderately under and over inflated tires. R and n are also constant. Therefore, in the case of a tire, pressure P and temperature T within a tire are the variables.

A system according to the present invention uses tire pressure and temperature data to determine whether a change in tire pressure is caused by an actual loss of air from the tire, or from a change in temperature. While the algorithm uses the PV=nRT law as its basis, an actual implementation may more appropriately use the automotive rule of thumb that tire pressure will increase by 1.24 kpa for every 1° C. the temperature rises in the tire (the converse case where temperature drops also applies). The rule of thumb for change in tire pressure between two temperatures would be:

$$P_{change}=(T_1-T_2) \cdot 1.24 \text{ kPa}$$

Where:
$T_1$=First Tire Temperaure (C)
$T_2$=Second Tire Temperature (C)

The estimated tire pressure at $T_2$ would be:

$$P_{Estimated}=P_1+P_{Change}$$

Where:
$P_1$=Measured tire pressure (kPa)
$P_{Change}$=Tire pressure change based on the rule of thumb for the same vehicle loading conditions (kPa)

Using this rule of thumb, a tire pressure change without a corresponding temperature change may indicate a true loss of air from the tire, while a tire pressure change along with a corresponding temperature change may indicate that a seasonal tire pressure adjustment is due.

FIG. 1 is a system diagram of an example tire pressure system 10 that includes a tire pressure sensor 15, a tire temperature sensor 20, a clock/timer 25, a display 30, a tire pressure estimator 35, a processor 40, a memory 45 and a user interface 50. The system 10 may be a stand alone system or may be part of the part of the vehicle systems (not shown). The tire pressure sensor 15 measures the tire pressure in the tire(s) 55 and the tire temperature sensor 20 measures the tire temperature. In some embodiments, the tire pressure sensor 15 may include a temperature sensing device. The clock/timer 25 may be used to determine the appropriate time to measure the tire pressure and the temperature, with the values being stored in the memory 45. The display 30 may be used to convey information to the driver concerning the tires and their condition. The tire pressure estimator 35 may be used to estimate the estimated tire pressure $P_{Estimated}$ using the equation discussed above. The processor 40 may be used to control the components of the system 10 and perform calculations to determine the cause of the tire pressure change. The memory 45 is used to store the tire information for use in the tire pressure estimator 35 and the processor 40. The user interface 50 is used to input information into the system 10, such as tire temperature and pressure information.

Figure 2:
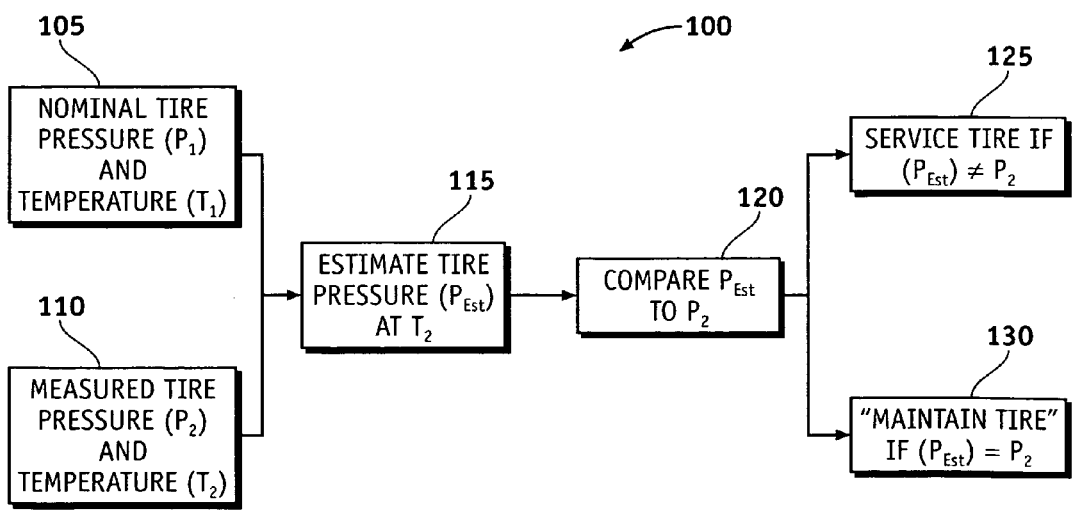
FIG. 2 is a flow chart of an example tire pressure system diagnostic process according to the invention.

FIG. 2 shows a flow chart of a tire pressure diagnostic process 100 using the rule of thumb equations listed above. An initial tire pressure $P_1$ and temperature $T_1$ are obtained at step 105. The initial tire pressure $P_1$ and temperature $T_1$ may be measured values, for example, taken by hand, by sensors inside the tire, or other known techniques. Measured tire pressure $P_2$ and temperature $T_2$ are obtained by known techniques at step 110. The tire pressure $P_2$ and temperature $T_2$ are measured after a time period, for example, a monthly time period.

Using the initial tire temperature $T_1$ and measured tire temperature $T_2$, the rule of thumb change in pressure may be calculated by $$P_{change}=(T_1-T_2) \cdot 1.24 \text{ kPa}.$$

By adding $P_{change}$ to the initial tire pressure $P_1$, an estimated tire pressure $P_{Est}$ at the measured tire temperature $T_2$ may be calculated at step 115. The estimated tire pressure $P_{Est}$ is a theoretical value that is compared to the measured tire pressure $P_2$ at step 120 to indicate if pressure change in a tire is due to air loss or temperature change. If $P_{Est}$ is greater or less than $P_2$, for example 5 kPa, then pressure loss in the tire is due to air loss at step 125. "Service Tire" indicates that the tire has lost air and the tire should be inspected and/or serviced to correct. If $P_{Est}$ is equivalent to $P_2$, for example within 5 kPa, then pressure loss in the tire is due to temperature change at step 130. "Maintain Tire" indicates that the tire should be inflated or deflated to the correct tire pressure.

The following examples are used to illustrate these scenarios.

EXAMPLE 1

Loss of Tire Pressure Due to Air Loss

The nominal tire pressure ($P_1$) and temperature ($T_1$) are 206 kPa and 30° C. respectively. The measured tire pressure ($P_2$) and temperature ($T_2$) are 186 kPa and 30° C. respectively. Since there is no drop in temperature, there should be no drop in measured tire pressure. Because there was pressure loss in the tire, this is due to air loss in the tire.

EXAMPLE 2

Loss of Tire Pressure Due to Temperature Drop

The nominal tire ($P_1$) and temperature ($T_1$) are 206 kPa and 30° C. respectively. The measured tire pressure ($P_2$) and temperature ($T_2$) are 186 kPa and 14° C. respectively. For a temperature drop of 16° C., the estimated tire pressure change should be $$P_{Change}=1.24 \text{ kPa}/°C. \cdot (14° C.-30° C.)=-19.84 \text{ kPa}.$$

So at 14° C., the estimated pressure ($P_{Estimated}$) should be $$P_{Estimated}=206 \text{ kPa}-19.84 \text{ kPa}=186.16 \text{ kPa}.$$

A $P_{Estimated}$ of 186.16 kPa is equivalent to 186 kPa, the measured tire pressure ($P_2$). Therefore, the perceived tire pressure loss is due to a drop in temperature and the user should increase air in the tire due to a temperature change.

EXAMPLE 3

Gain in Tire Pressure Due to Temperature Rise

The nominal tire pressure and temperature are 206 kPa and 30° C. respectively. The measured tire pressure and temperature are 226 kPa and 46° C. respectively. For a temperature rise of 16° C., the estimated tire pressure drop should be $$P_{change} = 1.24 \text{ kPa}/°C. \cdot (46°C. - 30°C.) = 19.84 \text{ kPa}.$$

So at 14° C., the estimated pressure ($P_{Estimated}$) should be $$P_{Estimated} = 206 \text{ kPa} + 19.84 \text{ kPa} = 225.84 \text{ kPa}.$$

A $P_{Estimated}$ of 225.84 kPa is equivalent to 226 kPa, the measured tire pressure ($P_2$). Therefore, the perceived tire pressure increase is due to a rise in temperature and the user should decrease air in the tire due to a temperature change.

In all three examples above, the user is required to service the vehicle tires and an indication can be provided to the driver as to the nature of the service required. In the case where the method detects a true loss of air from the tire (example 1), a message "Service Tire" can be used to indicate that a full tire inspection is required, while in the cases of seasonal temperature changes (examples 2 and 3), the message "Maintain Tire" can be used to indicate that a proper tire fill is all that is required.

While the examples above use nominal pressures and temperatures, algorithm performance can be improved if a set of tire pressures and temperatures are learned and then have the learned values used for comparison to current data. The learn procedure can either be user actuated, or could possibly take place automatically based on a detected tire fill event. The current values will only be evaluated once a Federal Motor Vehicle Safety Standard (FMVSS) 138 tire pressure event has taken place. FMVSS138 is the federal ruling that will dictate at what pressure level a low tire must be detected, for example, a tire that is 25% low. Then a "FMVSS138 event" would be a tire that is at least 25% low.

The following equation (equation 1) governs the actions taken by the algorithm:

$$\text{abs}\left| \frac{T_{CurrentTemp}(°C) - T_{LearnedTemp}(°C)}{5.55555556} + \frac{P_{LearnedPressure}(kPa) - P_{CurrentPressure}(kPa)}{6.894757} \right| = x$$

The value x of the calibration is selected during tire development. In one example:
If x>5 kPa, then "Service Tire."
If x<5 kPa, then "Maintain Tire."

The "Service Tire" message is intended to tell the driver that the tire needs to be repaired (tire plugged, patched, or replaced). The "Maintain Tire" message is intended to tell the driver that the tire's air pressure needs to be adjusted because the temperature has changed. The message display may be cleared once the FMVSS138 event has passed.

Detecting A Tire Overheat Condition—The algorithm as currently described limits its operation to conditions where a measurable pressure change has been detected. However, the equation being utilized incorporates the added possibility of detecting a tire overheat condition. The tire is determined to be overheated if the actual tire temperature is significantly above the predicted tire temperature. Predicted tire temperature is calculated based on the learned pressure and temperature. Overheat calibration would be tire dependent and its value selected by the tire manufacturer.

Going back to the original PV=nRT equation, it is evident that a loss of volume can be offset by a rise in temperature yielding a constant (or within nominal range) tire pressure. The proposed invention can be taken one step further and provide a user indication that a tire is potentially overheating. In order to accomplish this, equation 1 is used to initially detect an anomalous condition. Once detected, the learned to current temperature differential is evaluated to determine whether a "Tire Overheat" display is required.

Equation 2 for overheated tire conditions:

$$\text{abs}(T_{CurrentTemp} - T_{LearnedTemp}) = y$$

If y=0, then there is no tire overheat.
If y>than a specified number or range, then there is a tire overheat situation and the driver is informed of "Tire Overheat."

Seasonal Correction Estimation—If additional user guidance is desired, the same basic form of equation 1 can be modified to give the driver an estimate of the ambient temperature at which a seasonal correction will be required.

Equation 3:

$$T_{EstSeasonalAdjTemp} = T_{LearnedTemp} \pm \frac{(0.25)(5.5555556)P_{LearnedPressure}}{6.894757}$$

This way a customer can proactively maintain proper tire fill.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for determining the cause of tire pressure change, comprising:

obtaining a first tire pressure ($P_1$) for a first tire temperature ($T_1$);

obtaining a measured second tire pressure ($P_2$) for a second tire temperature ($T_2$);

calculating an estimated tire pressure ($P_{est}$) for the second tire temperature ($T_2$);

comparing the estimated tire pressure ($P_{est}$) to the measured second tire pressure ($T_2$);

and generating, based on the comparing step, a diagnostic message on a display, the diagnostic message indicative of a cause of a pressure change between $P_2$ and $P_1$ wherein the diagnostic message indicates a cause selected from the group comprising air loss and temperature.

2. The method of claim 1, wherein:
if the estimated tire pressure ($P_{est}$) is equivalent to the second tire pressure ($P_2$), determining that the pressure change is due to temperature;
if the estimated tire pressure ($P_{est}$) is not equivalent to the second tire pressure ($P_2$), determining that the pressure change is due to air loss; and
further comprising communicating the results of the comparison of the estimated tire pressure ($P_{est}$) to the second tire pressure ($P_2$).

3. The method of claim 2, wherein if the estimated tire pressure ($P_{est}$) is equivalent to the second tire pressure ($P_2$), the step of communicating the results includes setting the diagnostic message to a "Maintain Tire" message.

4. The method of claim 2, wherein if the estimated tire pressure ($P_{est}$) is not equivalent to the second tire pressure ($P_2$), the step of communicating the results includes setting the diagnostic message to a "Service Tire" message.

5. The method of claim 1, wherein obtaining a first tire pressure ($P_1$) for the first tire temperature ($T_1$) includes obtaining a placard tire pressure ($P_1$) for a placard temperature ($T_1$).

6. The method of claim 1, wherein obtaining a first tire pressure ($P_1$) for the first tire temperature ($T_1$) includes a learn procedure providing a learned pressure ($P_{LearnedPressure}$) at a learned tire temperature ($T_{LearnedTemp}$).

7. The method of claim 6, wherein the learn procedure is user actuated.

8. The method of claim 6, wherein the learn procedure takes place automatically based on a detected tire fill event.

9. The method of claim 6, wherein if the second tire temperature ($T_2$) is greater than the learned tire temperature ($T_{LearnedTemp}$) by a designated amount, the method further comprising setting the diagnostic message to a "Tire Overheat" message.

10. The method of claim 6, further comprising estimating the ambient temperature at which seasonal adjustment will be required ($T_{EstSeasonalAdjTemp}$).

11. The method of claim 10, wherein $$T_{EstSeasonalAdjTemp} = T_{LearnedTemp} \pm \frac{(0.25)(5.5555556)P_{LearnedPressure}}{6.894757}.$$

12. The method of claim 1, wherein $P_{Estimated} = P_1 + P_{Change}$.

13. The method of claim 12, wherein $P_{Change} = (T_1 - T_2) \cdot 1.24$ kPa.

14. A method for determining the cause of tire pressure change from a first tire temperature ($T_1$) to a second tire temperature ($T_2$), comprising:
estimating tire pressure ($P_{est}$) for the second tire temperature ($T_2$);
measuring a second tire pressure ($P_2$) for the second tire temperature ($T_2$);
comparing the estimated tire pressure ($P_{est}$) to the second tire pressure ($P_2$);
if the estimated tire pressure ($P_{est}$) is equivalent to the second tire pressure ($P_2$), indicating on a display that the pressure change is due to temperature;
and if the estimated tire pressure ($P_{est}$) is not equivalent to the second tire pressure ($P_2$), indicating, on the display that the pressure change is due to air loss.

15. The method of claim 14, further comprising communicating the results of the comparison of the estimated tire pressure ($P_{est}$) to the second tire pressure ($P_2$).

16. The method of claim 14, wherein if the pressure change is due to temperature, the method further comprising providing a "Maintain Tire" message.

17. The method of claim 14, wherein if the pressure change is due to air loss, the method further comprising providing a "Service Tire" message.

18. A tire pressure system, comprising:
a tire pressure sensor associated with at least one tire, the tire pressure sensor capable of measuring a tire pressure of the at least one tire;
a tire temperature sensor associated with the at least one tire, the tire temperature sensor capable of measuring tire temperature of the at least one tire;
processing logic in communication with the tire pressure sensor and the tire temperature sensor, the processing logic capable of estimating and comparing tire pressures at different temperatures for determining a tire pressure change in the at least one tire caused by one of temperature and air loss; and a display in communication with the processing logic, the display capable of communicating the cause of the tire pressure change.

19. The system of claim 18, further comprising a memory in communication with the control logic, the tire temperature sensor, and the tire pressure sensor, wherein:
the memory is capable of storage and retrieval of a first tire pressure ($P_1$) for the at least one tire received from the tire pressure sensor for a first tire temperature ($T_1$) received from the tire temperature sensor, storing a second tire pressure ($P_2$) for the at least one tire received from the tire pressure sensor for a second tire temperature ($T_2$) received from the tire temperature sensor; and wherein;
the control logic is capable estimating a tire pressure ($P_{est}$) at ($T_2$) for the at least one tire, and capable of determining one of:
the pressure change is caused by temperature ($P_{est}$) is equivalent to ($P_2$), and
the pressure change is caused by air loss if the estimated tire pressure ($P_{est}$) is not equivalent to ($P_2$).

* * * * *